Figure 1:
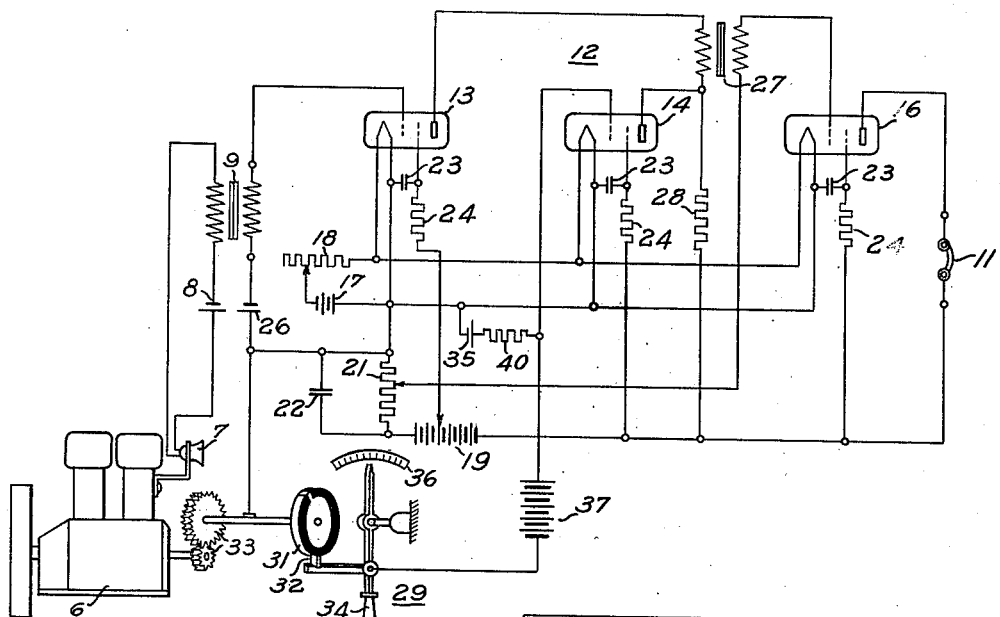

Sept. 26, 1939.　　　D. JOURNEAUX ET AL　　　2,174,176

AURAL STROBOSCOPE

Filed Sept. 23, 1936

Inventors
D. Journeaux
A. R. Durand
by
Attorney

Patented Sept. 26, 1939

2,174,176

UNITED STATES PATENT OFFICE 2,174,176

AURAL STROBOSCOPE

Didier Journeaux, Wauwatosa, and Samuel R. Durand, Milwaukee, Wis., assignors to Allis-Chalmers Manufacturing Company, Milwaukee, Wis., a corporation of Delaware Application September 23, 1936, Serial No. 102,102

6 Claims. (Cl. 73—51)

This invention relates in general to stroboscopes, and more particularly to an instrument for indicating or recording vibrations which may not readily be detected visually.

It is well known that the movement of a mechanism having a regular cycle of operation may be observed and analyzed visually by means of stroboscopes which illuminate the mechanism at a predetermined moment in each cycle of operation thereof. In such manner, it is possible to observe the operation of such mechanisms as internal combustion engines, electric motors, gear trains, etc. in which vibrations or other irregularities of motion may be detected and analyzed, provided that such irregularities occur in a portion of the mechanism which is visible and which may be illuminated, and provided that such irregularities be of visible magnitude. Such method however does not permit determination of the origin of vibrations of smaller magnitudes, including vibrations of audible frequency or so-called machinery noises, which are frequently an indication of faulty operation and which may also be objectionable per se. Such noises may result from lost motion between members in mechanical engagement, or from variations in the relative position of members in contact with a flow of fluid, such as the fixed and moving vanes of pumps, blowers or turbines of the rotary type, or such as the pole pieces and the armature slots of dynamo electric machines.

Although such noises may be observed by hearing, it is not always possible to separately recognize different noises occurring intermittently during different portions of the operating cycle of the mechanism under observation and, if such cycle is repeated a large number of times per second, it is not possible to determine at which moment of such cycle a particular noise occurs. Analysis of such noises may be obtained by impressing the vibrations to be analyzed on a transmitting device, converting such vibrations into electric current, and subjecting an indicating or recording device to the effect of such current only at predetermined moments in the operating cycle of the mechanism under observation. The actual position of the mechanism at such predetermined moments may then also be observed visually by means of a visual stroboscope.

It is, therefore, one of the objects of the present invention to provide a device for isolating vibrations produced at a predetermined moment of the operating cycle of a moving mechanism.

Another object of the present invention is to provide a device for observing vibrations produced at the different moments of the operating cycle of a moving mechanism.

Another object of the present invention is to provide a device for determining the moment of the operating cycle of a moving mechanism at which any particular vibration takes place therein.

Another object of the present invention is to provide a device for observing the position of a moving mechanism at which a particular vibration takes place therein.

Figure 2:
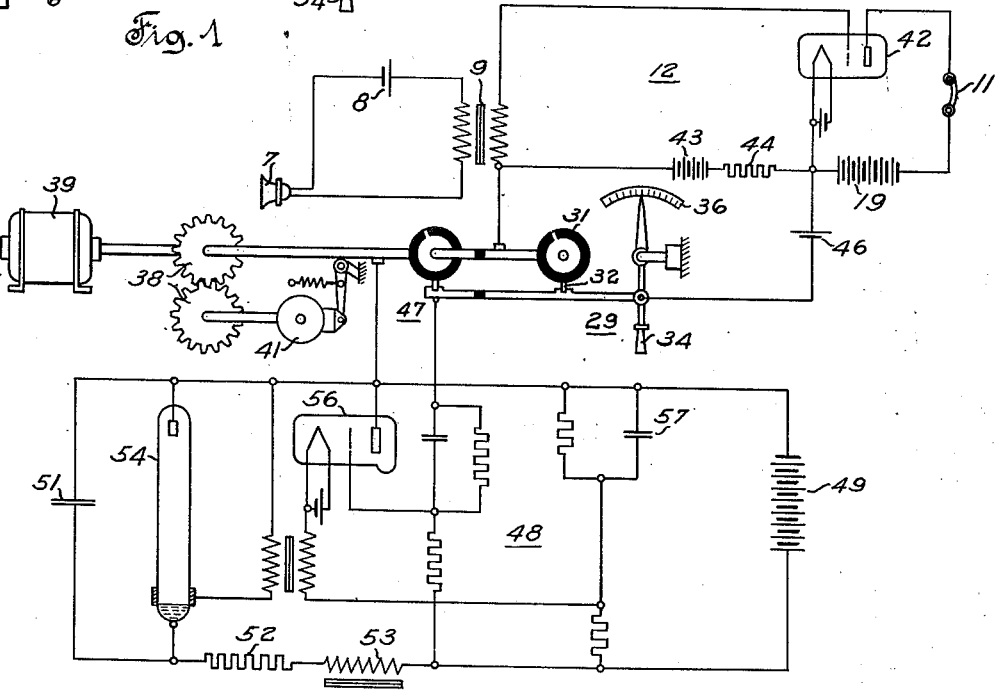

Objects and advantages other than those above set forth will be apparent from the following description when read in connection with the accompanying drawing, in which:

Fig. 1 diagrammatically illustrates one embodiment of the present invention in which the occurrence of a vibration in a moving mechanism is correlated to the position of the mechanism as indicated on a dial; and Fig. 2 diagrammatically illustrates another embodiment of the present invention in which the position of a moving mechanism is observed only at the time of occurrences of a predetermined vibration.

Elements performing the same functions in the two embodiments shown are designated therein by the same reference numerals. It will be understood that elements illustrated in one of the figures of the drawing may also be combined with elements illustrated in the other figure to form further embodiments of the invention.

Referring more particularly to the drawing by characters of reference, reference numeral 6 designates the mechanism such as an internal combustion engine, which it is desired to observe in operation. Vibrations of audible and other frequencies produced in the engine are detected by means of a suitable vibration responsive device, such as a microphone 7 of any suitable type adapted to be subjected to the vibration produced by the engine. The microphone is illustrated as being of the carbon granule type, and is suitably arranged with respect to engine 6. For example, the microphone may be supported independently of engine 6 and focused toward any particular portion of the engine, but to obtain the greatest possible response of the microphone to the vibrations of engine 6 the body of the microphone is rigidly mounted on any desired part of the engine to follow the movements thereof, the vibrations of contact resistance of the carbon granules resulting from the inertia of such granules. The microphone is associated with suitable means such as a circuit comprising a battery 8 and a transformer 9, connected therewith for producing an electric current in response to the amplitude and frequency of the vibrations impressed on the microphone. A current indicating device is suitably connected with transformer 9 to operate in response to the variations of the flow of current through the microphone. Such device may be an electric meter of the indicating or of the recording type, or an oscillograph, and if only audible vibrations are to be detected the device may be a telephone receiver 11.

In general, the output energy of transformer 9 is too low to cause the production of a sufficiently audible signal in receiver 11. It is therefore preferable to include in the current producing means an amplifier, generally designated by 12, provided with input terminals connected with transformer 9 and with output terminals connected with receiver 11. The amplifier may be of any of the known types, and preferably comprises three electric valves 13, 14, 16 of the screen-grid high vacuum type each having an anode, a control grid, a screen-grid and a cathode. The cathode filaments of all three valves may be energized from a common source, such as a battery 17, through an adjustable rheostat 18, and the three valves are provided with a common plate battery 19 connected with the cathodes of the valves through a tapped rheostat 21 serving as source of bias potential for the control grid of valve 16. Rheostat 21 is connected in parallel with a capacitor 22 serving to by-pass alternating current from the rheostat. The screen-grids of the valves are severally connected with the associated cathodes through capacitors 23, and are connected with the positive terminal or with an intermediate point of battery 19 through resistors 24. The control grid of valve 13 is connected with the associated cathode through the secondary winding of transformer 9 and through a bias battery 26. The control grid of valve 16 is connected with the associated cathode through a portion of rheostat 21 and through the secondary winding of a transformer 27 having the primary winding thereof inserted in series with a resistor 28 in the plate circuit of valve 14. Receiver 11 is connected in the plate circuit of valve 16 to receive the output current of the amplifier and to translate such current into audible vibrations.

The operation of receiver 11 is controlled by means such as a switch 29 controlling the amplitude of the output current of amplifier 12, adapted to be actuated in synchronism with the mechanism 6. Switch 29 is preferably of the contactor type comprising a rotary conductive drum 31 cooperating with a fixed brush 32, the drum being covered with a layer of insulation interrupted at one point by a single conductive segment. The drum is adapted to be driven in synchronism with engine 6 in any suitable manner, such result being preferably obtained by connecting the drum with the shaft of the engine. Such connection may be effected directly to cause switch drum 31 to make one revolution for each revolution of the shaft of engine 6, or may be made through gears 33, if engine 6 is of the four-cycle type, to cause drum 31 to make one revolution for every two revolutions of the engine shaft. The position of the shaft of engine 6 corresponding to the engagement of brush 32 with the segment of drum 31 may be varied by displacing brush 32 about drum 31 by means of a lever 34 of which the position may be indicated by a pointer on a scale 36. Switch 29 connects the control grid of valve 14 with the associated cathode through a source of negative potential such as the battery 37, another connection between the grid and the cathode being established through a source of potential less negative than the potential of battery 37, such as a battery 35 and a resistor 40.

In operation, engine 6 whether operating at a constant or variable speed, is subject to complex vibration of different amplitudes and frequencies including audible frequencies, such vibrations being produced at different moments in the cycle of operation of the engine. During the successive passages of the shaft of the engine through one of certain particular positions, the engine produces a certain periodically intermittent vibration. Assuming that it is desired to observe the nature and condition of occurrence of such certain vibration, it is necessary to isolate it from other vibrations intervening between the periods of occurrence thereof. All the engine vibrations are impressed on microphone 7, and a corresponding current flows through the microphone and through the primary of transformer 9, the output voltage of the transformer being amplified by valves 13 and 16 and being impressed on receiver 11. To isolate any vibration, switch 29 is operable in synchronism with the periods of occurrence of such vibration to close the circuit thereof during such periods to thereby control the operation of amplifier 12. The control grid of valve 14 is thus maintained momentarily at a predetermined negative potential with respect to the associated cathode by means of battery 37, the voltage of the battery being so chosen that valve 14 is then substantially non-conductive and has no material effect on the operation of valves 13 and 16. During the intervening periods, the control grid of valve 14 is maintained at another potential with respect to the associated cathode by means of battery 35. The voltage of battery 35 is so chosen that, during such intervening periods, valve 14 is materially conductive and thus periodically substantially short circuits valve 13 which is connected in parallel thereto through the primary winding of transformer 27, thus rendering valve 13 intermittently inoperative to amplify the current of microphone 7. It will be understood that valve 14 need not provide a path of substantially zero impedance across valve 13, but needs only draw a flow of current such that the greater portion of the voltage of battery 19 appears across resistor 28, the residual voltage impressed across the anode and the cathode of valve 13 being reduced below the value necessary for rendering valve 13 operative.

Amplifier 12 is thus rendered operative only at predetermined moments of each cycle of operation of engine 6, i. e. during the occurrence of the vibration under consideration, and is otherwise inoperative. Receiver 11 is thus subjected to the effect of the electric current of microphone 7 only during the periods of occurrence of the predetermined vibration. By moving lever 34, switch 29 may be caused to close at any desired moment of the cycle of the operation of engine 6 and it is thus possible to isolate vibrations occurring in the engine at any particular moment of the operating cycle thereof. The point of such cycle at which the vibration detected in receiver 11 occurs is indicated on scale 36, which may be calibrated in angular positions of the crankshaft of the engine. By controlling the operation of amplifier 12 by means of valve 14, switch 29 is not inserted directly in the amplifying circuit, and the closing and opening of such switch does not introduce any transients in the current of receiver 11. If such transients are of too small magnitude to be objectionable, or if they may be readily distinguished from the vibrations of the engine, a simpler arrangement may be utilized, as shown in Fig. 2.

In the embodiment illustrated in Fig. 2, microphone 7 is assumed to be subjected to audible vibrations transmitted thereto through air by a pair of gears 38, such gears transmitting energy between an electric motor 39 and an energy consuming device such as a brake 41. In the present embodiment, amplifier 12 comprises a single electric valve of the three electrode high vacuum type controlling the flow of current between battery 19 and receiver 11. The grid of valve 42 is connected with the associated cathode through a source of negative potential such as a battery 43 and through a resistor 44 to normally maintain the valve substantially non-conductive. Switch 29 is preferably actuated in synchronism with gears 38 by driving drum 31 from motor 39, and is utilized for connecting the grid of valve 42 with the associated cathode independently of battery 43 through a source of potential such as a battery 46 less negative than the potential of battery 43, to render valve 42 conductive to an extent depending on the action of transformer 9, and to thus render the amplifier operative. Switch 29 is actuated simultaneously with another switch 47 forming part of a visual stroboscope 48. The stroboscope may be of any type known in the art and may comprise a source of direct current, such as a battery 49, adapted to charge a capacitor 51 through a resistor 52 and a reactor 53. The capacitor may be periodically discharged through a mercury vapor lamp 54 serving to illuminate gears 38 during movement thereof in response to each closure of switch 47. Such result is obtained by charging another capacitor 57 from battery 49 and by utilizing the switch for controlling the grid of a vapor electric valve 56 to cause valve 56 to periodically discharge capacitor 57, through an inductive circuit. Such discharges are used for impressing potential impulses on the starting band of lamp 54. Lever 34 is utilized for simultaneously adjusting the operation of switches 29 and 47 with respect to the operating cycle of gears 38 to cause the stroboscope to illuminate gears 38 during the periods of operation of amplifier 12.

With the arrangement diagrammatically illustrated in Fig. 2, vibrations of gears 38 appearing as noises transmitted to microphone 7 are continuously translated into electric current flowing through transformer 9. Battery 43 generally maintains valve 42 substantially non-conductive and receiver 11 is thus generally without current. During each closure of switch 29 battery 46 overcomes the action of battery 43 and renders valve 42 conductive to an extent depending upon the action of transformer 9. Receiver 11 thus indicates the noise produced by gears 38 only during successive passages of a pair of cooperating teeth of the gear through a particular relative position, in which position the gears are illuminated by stroboscope 48. By moving lever 34, such position may be varied for observing the different points of the entire period of engagement of any pair of teeth of the gears. If desired, switches 29 and 47 may be actuated at such speed as to close once during the engagement of each pair of teeth of gears 38, to hear the average amount of noise produced by the gears at each point of the engagement of all the teeth thereof, and to render visible the average motion of such teeth at each such position.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A device for isolating vibrations produced by a moving mechanism having a periodic cycle of operation, comprising means including a microphone adapted to be subjected to vibrations by the mechanism for translating the vibrations into electric current, an amplifier having input terminals connected with said vibration translating means and comprising an electric valve having a cathode and a control grid, a source of current connected between said cathode and said grid to maintain said valve non-conductive, a switch adapted to be actuated in synchronism with the mechanism for connecting said grid with said cathode independently of said source to render said valve conductive, means for adjusting the operation of said switch with respect to the operating cycle of said mechanism, whereby said amplifier is rendered operative only during closure of said switch, means for indicating the adjusted position of said switch, and an indicating device connected for receiving current from said amplifier.

2. A device for isolating vibrations produced by a moving mechanism having a periodic cycle of operation, comprising means including a microphone adapted to be subjected to vibrations by the mechanism for translating the vibrations into electric current, an amplifier having input terminals connected with said vibration translating means and having output terminals, an indicating device connected with the output terminals of said amplifier, a switch for controlling the operation of said amplifier, a stroboscope including another switch for intermittently illuminating the mechanism, means for simultaneously actuating said switches in synchronism with the mechanism, means for adjusting the operation of said switches with respect to the operating cycle of the mechanism, and means for indicating the adjusted position of said switches.

3. A device for isolating vibrations produced by a moving mechanism having a periodic cycle of operation, comprising means including a microphone adapted to be subjected to vibrations by the mechanism for translating the vibrations into electric current, an amplifier having input terminals coupled with said vibration translating means and comprising an electric valve, a second electric valve for periodically by-passing the first said valve to render the first said valve inoperative, means comprising a switch actuable in synchronism with said mechanism for controlling the conductivity of the said second electric valve, means for adjusting the operation of said switch with respect to the operating cycle of said mechanism, and means for indicating the adjusted position of said switch.

4. In combination, a microphone subjected to recurring successions of vibrations of differing characteristics including an intermittent vibration having a particular characteristic, means comprising an electric valve coupled with said microphone for producing electric current in response to the impression of said vibrations on said microphone, an indicating device coupled with said current producing means for indicating the characteristic of said intermittent vibration, means variably adjustable in said sense as to cause operation of said indicating device only during periods of said intermittent vibration comprising means periodically operable in synchronism with the periods of occurrence of said intermittent vibration for controlling the conductivity of said valve in such sense as to render the said current producing means operative only during the periods of said intermittent operation, and means for indicating the adjustment of the second said means.

5. An apparatus for testing a machine having a rotary member, to selectively determine the frequency and angular location relative to said rotary member of periodic noises produced by said machine; comprising a microphone responsive to said noises for producing electric current variations, a frequency indicator electrically coupled to said microphone, an intermittent electric switch actuated by said rotary member for rendering said indicator effective at periodic intervals, and means for adjusting the effective position of the switch relative to the angular position of said member, to thereby adjust the time at which said indicator is rendered effective.

6. The apparatus recited in claim 5, a stroboscope operable by said rotary member and means for adjusting said stroboscope in unison with said switch.

DIDIER JOURNEAUX.
SAMUEL R. DURAND.

CERTIFICATE OF CORRECTION.

Patent No. 2,174,176. September 26, 1939.

DIDIER JOURNEAUX, ET AL.

It is hereby certified that error appears in the printed specification of the above numbered patent requiring correction as follows: Page 4, first column, line 5, claim 4, for the word "said" read such; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.